United States Patent
Pescosolido et al.

(10) Patent No.: US 9,267,389 B2
(45) Date of Patent: Feb. 23, 2016

(54) GEARED ARCHITECTURE CARRIER TORQUE FRAME ASSEMBLY

(75) Inventors: Alessio Pescosolido, West Hartford, CT (US); Marc J. Muldoon, Marlborough, CT (US); James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 925 days.

(21) Appl. No.: 13/488,754

(22) Filed: Jun. 5, 2012

(65) Prior Publication Data

US 2013/0319011 A1     Dec. 5, 2013

(51) Int. Cl.
  *F01D 15/12*     (2006.01)
(52) U.S. Cl.
  CPC ...... *F01D 15/12* (2013.01); *F05D 2260/40311* (2013.01); *Y02T 50/671* (2013.01); *Y10T 29/49229* (2015.01)
(58) Field of Classification Search
  CPC ......... F01D 5/066; F01D 15/12; F02C 3/107; F02C 7/36; F05D 2260/40311; F16H 1/2836; F16H 57/0479; F16H 57/0482; F16H 57/082
  USPC .......................................... 475/331, 346, 347
  See application file for complete search history.

(56) References Cited

U.S. PATENT DOCUMENTS

| | | | |
|---|---|---|---|
| 4,983,152 A | 1/1991 | Kimberlin et al. | |
| 5,382,203 A | 1/1995 | Bellman et al. | |
| 5,466,198 A | 11/1995 | McKibbin et al. | |
| 6,663,530 B2 | 12/2003 | Poulin et al. | |
| 7,011,599 B2 * | 3/2006 | Becquerelle et al. | 475/331 |
| 7,104,918 B2 | 9/2006 | Mitrovic | |
| 7,926,260 B2 * | 4/2011 | Sheridan et al. | 60/226.1 |
| 8,585,538 B2 * | 11/2013 | Sheridan et al. | 475/346 |
| 2005/0026745 A1 | 2/2005 | Mitrovic | |
| 2005/0215390 A1 | 9/2005 | Poulin et al. | |
| 2006/0223664 A1 | 10/2006 | Duong et al. | |
| 2010/0105516 A1 | 4/2010 | Sheridan et al. | |
| 2011/0206498 A1 | 8/2011 | McCooey | |

FOREIGN PATENT DOCUMENTS

EP     1985850 A1     10/2008

OTHER PUBLICATIONS

International Search Report and Written Opinion for International Application No. PCT/US2013/042808 mailed on Mar. 10, 2014.
International Preliminary Report on Patentablity for PCT Application No. PCT/US/2013/042808, mailed Dec. 18, 2014.

* cited by examiner

*Primary Examiner* — Arun Goyal
(74) *Attorney, Agent, or Firm* — Carlson, Gaskey & Olds, P.C.

(57) ABSTRACT

A fan drive gear system for a gas turbine engine includes a carrier supporting circumferentially arranged gears within gear mount sections spaced circumferentially about a periphery. A shelf is disposed between each of the gear mounting sections. A torque frame is attached to the carrier and includes circumferentially arranged finger sections. Each of the finger sections includes first and second ends that are spaced apart to receive the shelf. A pin extends through openings in the shelf and first and second ends to secure the torque frame to the carrier.

18 Claims, 6 Drawing Sheets

GEARED ARCHITECTURE CARRIER TORQUE FRAME ASSEMBLY

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. A speed reduction device such as an epicyclical gear assembly may be utilized to drive the fan section such that the fan section may rotate at a speed different than the turbine section so as to increase the overall propulsive efficiency of the engine.

One type of epicyclical gear assembly includes a carrier supporting multiple intermediate gears such as star or planet gears. The intermediate gears intermesh with a centrally located sun gear and a ring gear circumscribes the intermediate gears. A torque frame is used to support the carrier relative to another structure that may be fixed or rotating. A connection between the torque frame and carrier provides for the transmission of torque and is designed to endure the mechanical stress and strains encountered during operation. However, the larger the connection features, the less space is available for the intermediate gears. Moreover, the carrier and torque frame also contribute to the overall structural weight of the gear assembly.

Accordingly, it is desirable to design and develop improved connection features to provide the desired mechanical and durability properties while providing increased space for gears of the gear assembly.

SUMMARY

A fan drive gear system for a gas turbine engine according to an exemplary embodiment of this disclosure, among other possible things includes a carrier supporting circumferentially arranged gears, the carrier including gear mount sections spaced circumferentially about a periphery and a shelf disposed between the gear mounting sections, a torque frame having circumferentially arranged finger sections each including first and second ends spaced a distance apart for receiving the shelf therebetween, and a pin extending through openings in the shelf and first and second ends for securing the torque frame to the carrier.

A further embodiment of the foregoing fan drive gear system, wherein the shelf extends between gear mount sections about the periphery of the carrier and comprises an axial width less an axial width of the carrier.

A further embodiment of any of the foregoing fan drive gear systems, wherein the torque frame includes a hub and the finger section includes a base extending from the hub to the first and second ends.

A further embodiment of any of the foregoing fan drive gear systems, wherein the base includes a circumferential width that increases in a direction toward the hub.

A further embodiment of any of the foregoing fan drive gear systems, wherein the base includes a width that is less than a distance between outer surfaces of the first and second ends.

A further embodiment of any of the foregoing fan drive gear systems, including at least one bushing supported in at least one of the openings in the shelf and the first and second ends for supporting the pin.

A further embodiment of any of the foregoing fan drive gear systems, including a retaining pin received within an opening of the shelf for holding the pin within the openings in the shelf and the first and second ends.

A further embodiment of any of the foregoing fan drive gear systems, including a sun gear, star gears supported by the carrier, and ring gear circumscribing the star gears, the star gears intermeshing with the sun gear and the ring gear.

A gas turbine engine according to an exemplary embodiment of this disclosure, among other possible things includes a fan section including a plurality of fan blades rotatable about an axis, a compressor section, a combustor in fluid communication with the compressor section, a turbine section in fluid communication with the combustor, and a geared architecture driven by the turbine section for rotating the fan blades about the axis. The geared architecture includes a carrier supporting circumferentially arranged gears, the carrier including gear mount sections spaced circumferentially about a periphery and a shelf disposed between the gear mounting sections, a torque frame having circumferentially arranged finger sections each including first and second ends spaced a distance apart for receiving the shelf therebetween, and a pin extending through openings in the shelf and first and second ends for securing the torque frame to the carrier.

A further embodiment of the foregoing gas turbine engine, wherein the geared architecture includes a sun gear, intermediate gears supported by the carrier, and a ring gear circumscribing the intermediate gears, the intermediate gears intermeshing with the sun gear and the ring gear.

A further embodiment of any of the foregoing gas turbine engines, wherein the fan section is coupled to the ring gear and the torque frame is coupled to a fixed structure.

A further embodiment of any of the foregoing gas turbine engines, wherein the fan section is coupled to the torque frame.

A further embodiment of any of the foregoing gas turbine engines, wherein the shelf extends between gear mount sections about the periphery of the carrier and comprises an axial width less than an axial width of the carrier.

A further embodiment of any of the foregoing gas turbine engines, wherein the torque frame includes a hub and the finger section includes a base extending axially from the hub to the first and second ends.

A further embodiment of any of the foregoing gas turbine engines, wherein the base includes a circumferential width that increases in a direction toward the hub.

A method of assembling a fan drive gear system for a gas turbine engine according to an exemplary embodiment of this disclosure, among other possible things includes inserting a shelf extending between gear mount sections of a carrier into space defined between ends of a finger section of a torque frame, and inserting a pin through openings defined in the ends of the finger section and the shelf.

A further embodiment of the foregoing method, including inserting bushings within openings of the ends of the finger section and the shelf prior to inserting the pin and inserting the pin through the bushings.

A further embodiment of any of the foregoing methods, including inserting a retaining pin into an opening in the shelf for holding the pin within the openings in the ends of the finger section and the shelf.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
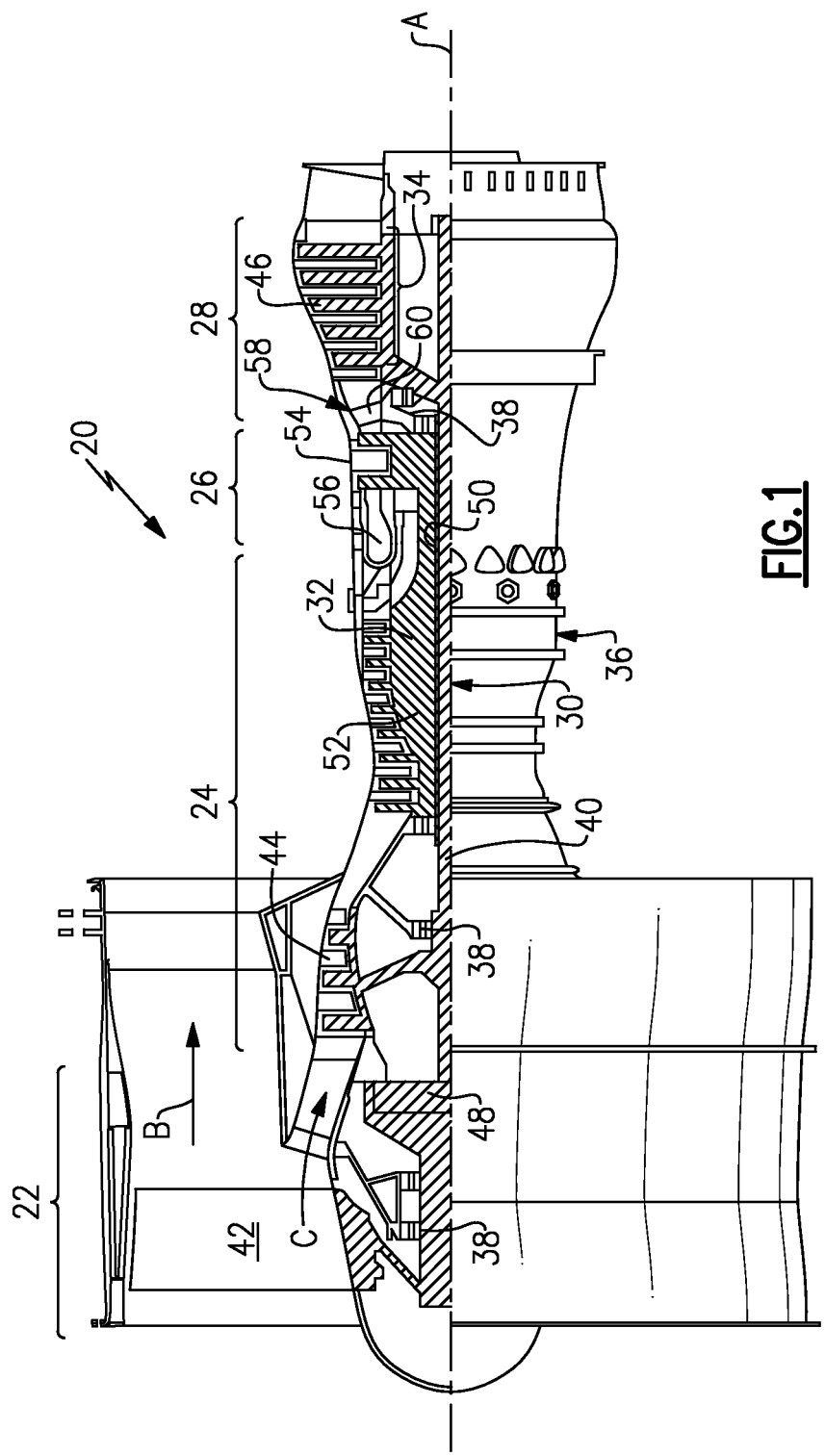
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
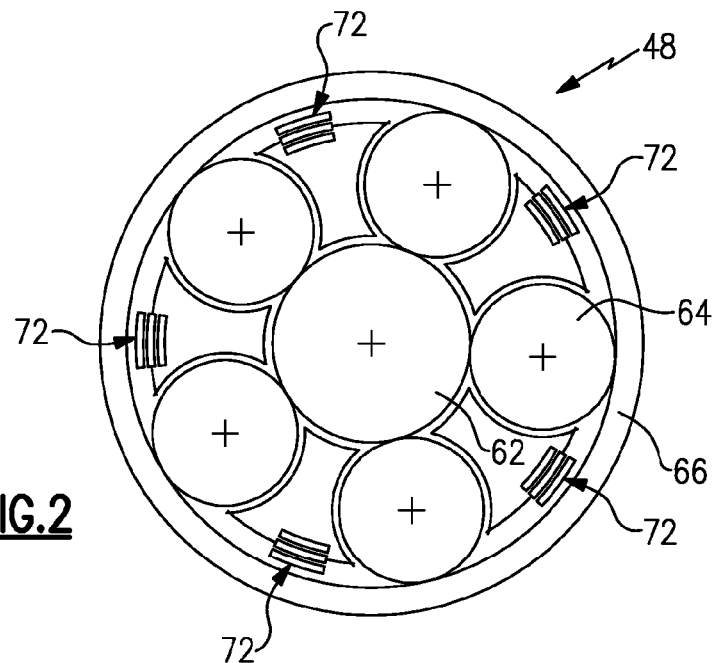
FIG. 2 is a schematic view of an example geared architecture assembly.

Referring to FIG. 2, a disclosed example geared architecture 48 includes a sun gear 62 that is meshed with intermediate gears 64. The intermediate gears 64 are intermeshed with both the sun gear 62 and a ring gear 66. The intermediate gears 64 are known alternatively as sun gears or planet gears depending on a specific configuration of the geared architecture. As appreciated, the example gear architecture represents an epicyclical gear box that provides the desired gear reduction.

The intermediate gears 64 are supported by a carrier 68. The carrier 68 provides a structure that supports journal pins (not shown) that maintain relative alignment between the intermediate gear 64, the ring gear 66, and the sun gear 62.

The carrier 68 is attached to a torque frame 70 (Best shown in FIG. 5) that transmits torque from the geared architecture 48 to a rotating structure or to a fixed structure to maintain a position of the intermediate gear 64 relative to the sun gear 62. The connection between the carrier 68 and the torque frame 70 are provided at connections 72 spaced about a circumference of the carrier 68.

Figure 3:
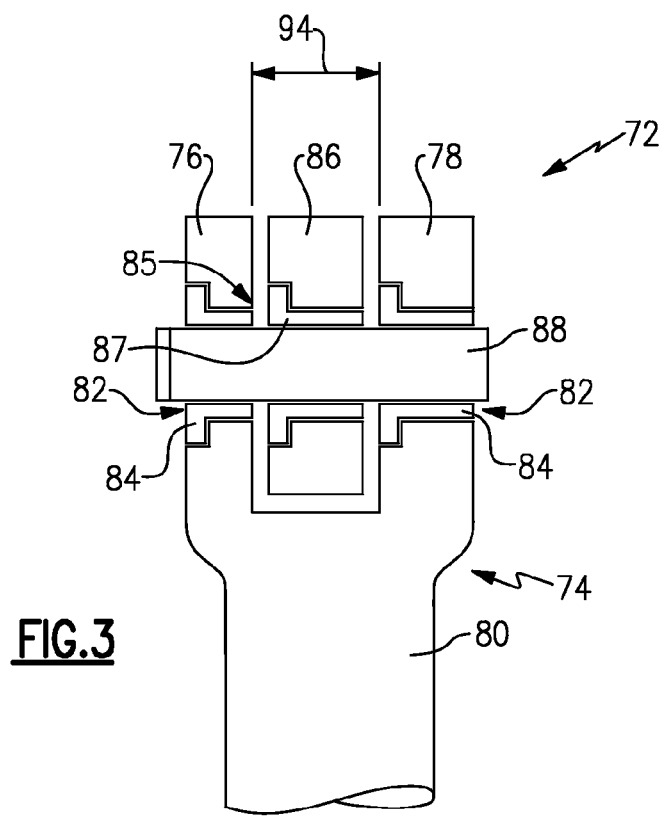
FIG. 3 is an enlarged view of a connection between an example torque frame and carrier.

Referring to FIG. 3, an example connection 72 is shown in cross section and includes a finger section 74 of the torque frame 70. The finger section 74 includes a base 80 that supports first and second ends 76, 78. The first and second ends 76, 78 are spaced a distance 94 apart. The distance 94 provides a space for receiving a shelf 86 of the carrier 68.

A connecting pin 88 extends through openings 82 within the first and second end 76, 78 and opening 85 in the shelf 86. Bushings 84 may be disposed within the openings 82 to support the connecting pin 88. The opening 85 that is aligned with the openings 82 within the first and second ends 76, 78 can include a bushing 87. The bushings 84, 87 provide lubrication of the connecting pin 88 to prevent wearing at the connection 72 between the torque frame 70 and the carrier 68.

Figure 4:
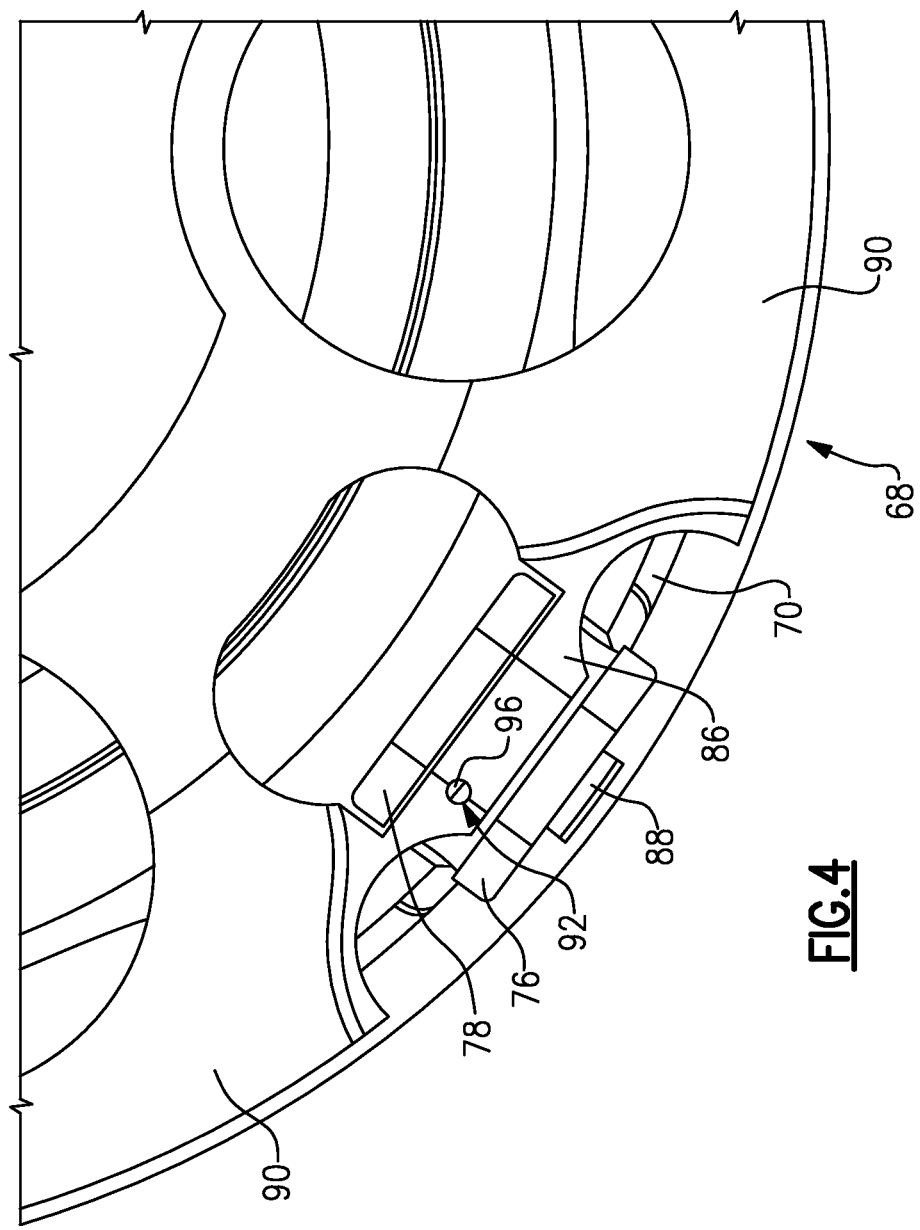
FIG. 4 is a top view of a connection between a torque frame and carrier.

Referring to FIG. 4 with continued reference to FIGS. 2 and 3, the example carrier 68 includes gear mount sections 90 for supporting the intermediate gears 64 (FIG. 2). A web portion extending between the gear mount sections 90 includes the shelf 86. The shelf 86 includes the opening 85 for the connecting pin 88. The shelf 86 also includes an opening 92 for a retaining pin 96 that intersects the connecting pin 88. The retaining pin 96 holds the connecting pin 88 within the openings 85 of the shelf 86 and the openings 82 of the first and second end 76, 78.

Figure 5:
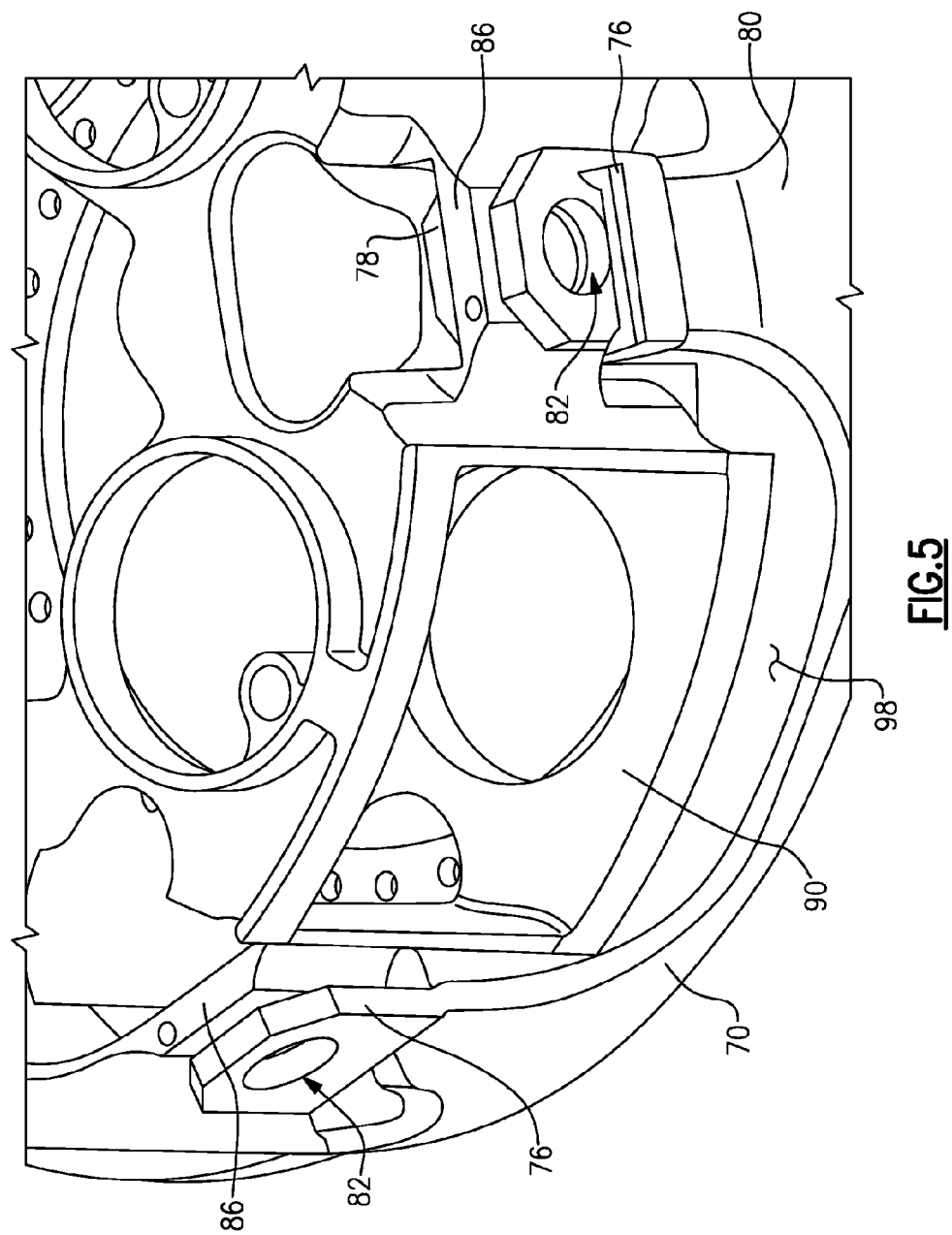
FIG. 5 is a perspective view of a connection between an example torque frame and carrier.

Referring to FIG. 5, the example shelf 86 is received within the space provided by the distance 94 between the first and second ends 76, 78 of one of the example finger sections 74. The shelf 86 is disposed about the periphery of the carrier 68 between gear mount sections 90. The shelf 86 is of a substantially reduced size relative to the gear mount sections 90 along the periphery of the carrier 68 to provide circumferential room for the mount sections 90.

Circumferential space of the carrier 68 defines the bounds for the size of the intermediate gears 64 within a given outer diameter defined by the ring gear 66. The longer the shelf 86 circumferentially about the carrier periphery, the less circumferential space is provided for the gear mount sections 90, and thereby the intermediate gears 64. The example carrier 68 reduces the amount of space required for the connection 72 with the reduced size of the shelf 86 defined as the web portion extending between the ear mount sections 90.

Figure 6:
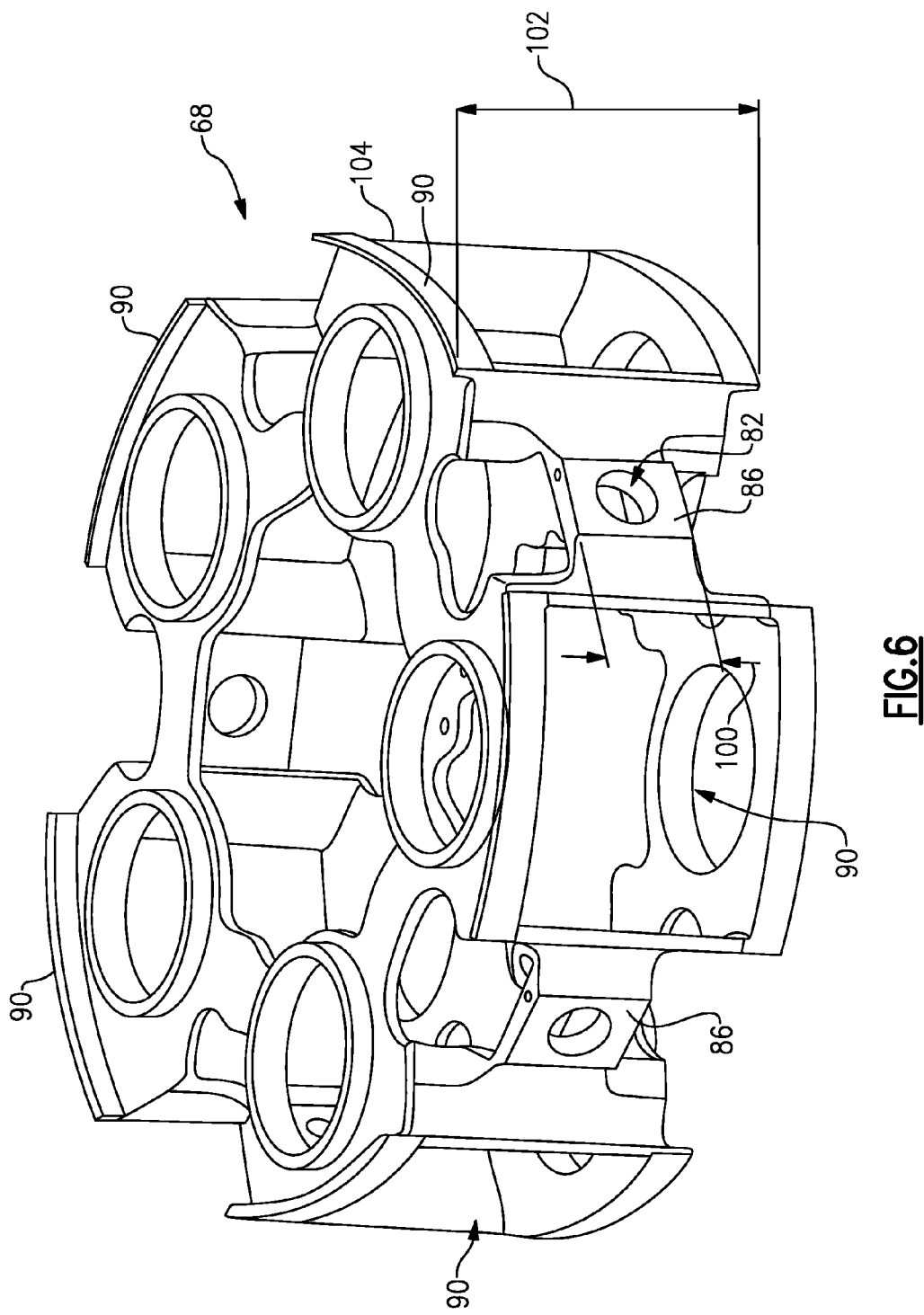
FIG. 6 is a perspective view of an example carrier.
Figure 7:
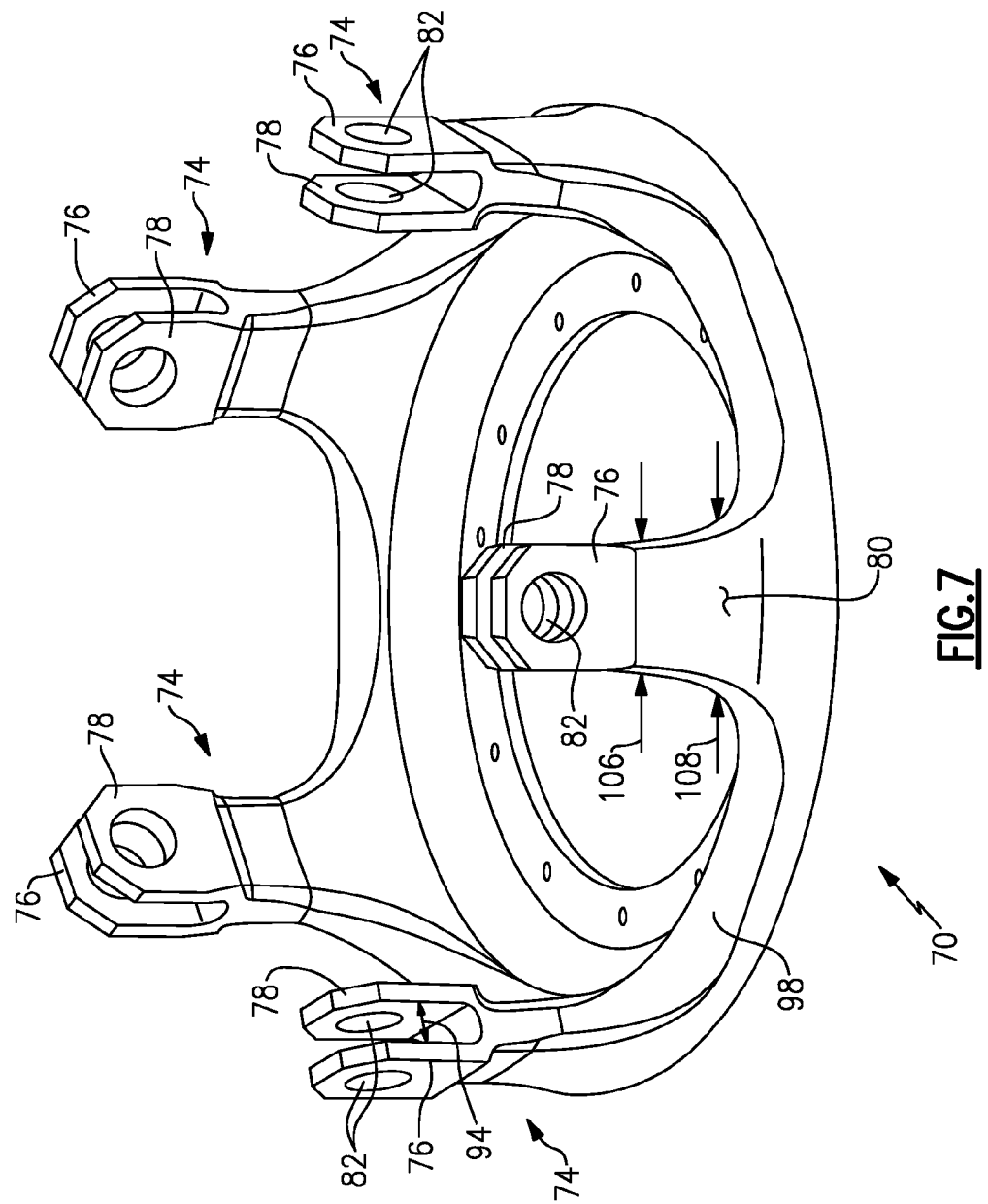
FIG. 7 is a perspective view of an example torque frame.

Referring to FIGS. 6 and 7 with continued reference to FIG. 5, the example carrier 68 includes the shelf 86 that includes an axial width 100 that is less than an axial width 102 of the carrier 68. The reduction in the axial width 100 of the shelf 86 reduces the overall mass and material required for fabrication of the carrier 68. The reduction in material utilized for fabricating the carrier 68 reduces the overall weight of the geared architecture 48.

Referring to FIG. 7, the example torque frame 70 includes a hub portion 98 and a plurality of finger sections 74. Each of the finger sections 74 includes a base 80 that extends outward from the hub 98. The base 80 includes a width 106 near the ends 76, 78 that is less than a width 108 near to the hub portion 98. Accordingly, the base 80 includes a width 106, 108 that tapers circumferentially outwardly in a direction away from the first and second ends 76, 78. Increasing the width of the base 80 towards the hub 98 provides additional strength in the finger sections 74 while allowing for the reduction in material required in the carrier 68. The base 80 further includes a width 106 that is less than a width 108 between outer surfaces of the first and second ends 76, 78.

The finger sections 74 of the torque frame 70 include a substantial circumferential width that increases the strength of the base 80 and the connection 72. Increases in circumferential width provide a greater increase in overall strength as compared to increasing width in a radial direction. In the disclosed example, the increase in width in the circumferential direction increases overall strength by two orders or magnitude as compared to a similar width provided in a radial direction. Accordingly, the example torque finger sections 74 provide greater strength while also providing for the fabrication of the example torque frame 70 of reduced weight and material.

The shelf 86 of the example carrier further provides for the reduction in material utilized to support the geared architecture 48. The example carrier 68 includes significantly less material to provide the same strength and mechanical durability properties desired of the carrier 68.

Accordingly, the example gear architecture includes a carrier 68 and torque frame connection 72 that enables a reduction in material and weigh of both the carrier and torque frame 70. Moreover, the connection 72 between the torque frame 70 and the carrier 68 reduces the overall weight of the geared architecture 48 while increasing the mechanical strength and limiting the amount of material required supporting the geared architecture 48.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:
1. A fan drive gear system for a gas turbine engine comprising:

a carrier supporting circumferentially arranged gears, the carrier including gear mount sections spaced circumferentially about a periphery and a shelf disposed between the gear mount sections;

a torque frame having circumferentially arranged finger sections, wherein each finger section includes a first end spaced a distance apart from a second end for receiving the shelf therebetween; and a pin extending through openings in the shelf and the first end and the second end for securing the torque frame to the carrier.

2. The fan drive gear system as recited in claim 1, wherein the shelf extends between gear mount sections about the periphery of the carrier and comprises an axial width less an axial width of the carrier.

3. The fan drive gear system as recited in claim 2, wherein the torque frame includes a hub and the finger section includes a base extending from the hub to the first end and the second end.

4. The fan drive gear system as recited in claim 3, wherein the base includes a circumferential width that increases in a direction toward the hub.

5. The fan drive gear system as recited in claim 3, wherein the base includes a width that is less than a distance between outer surfaces of the first end and the second end.

6. The fan drive gear system as recited in claim 1, including at least one bushing supported in at least one of the openings in the shelf and the first end and the second end for supporting the pin.

7. The fan drive gear system as recited in claim 6, including a retaining pin received within an opening of the shelf for holding the pin within the openings in the shelf and the first end and the second end.

8. The fan drive gear system as recited in claim 1, comprising a sun gear, star gears supported by the carrier, and ring gear circumscribing the star gears, the star gears intermeshing with the sun gear and the ring gear.

9. A gas turbine engine comprising:

a fan section including a plurality of fan blades rotatable about an axis;

a compressor section;

a combustor in fluid communication with the compressor section;

a turbine section in fluid communication with the combustor; and a geared architecture driven by the turbine section for rotating the fan blades about the axis, the geared architecture including:

a carrier supporting circumferentially arranged gears, the carrier including gear mount sections spaced circumferentially about a periphery and a shelf disposed between the gear mount sections;

a torque frame having circumferentially arranged finger sections, wherein each of the finger sections include a first end and a second end spaced a distance apart from the first end for receiving the shelf therebetween; and a pin extending through openings in the shelf and the first end and the second end for securing the torque frame to the carrier.

10. The gas turbine engine as recited in claim 9, wherein the geared architecture includes a sun gear, intermediate gears supported by the carrier, and a ring gear circumscribing the intermediate gears, the intermediate gears intermeshing with the sun gear and the ring gear.

11. The gas turbine engine as recited in claim 10, wherein the fan section is coupled to the ring gear and the torque frame is coupled to a fixed structure.

12. The gas turbine engine as recited in claim 10, wherein the fan section is coupled to the torque frame.

13. The gas turbine engine as recited in claim 9, wherein the shelf extends between gear mount sections about the periphery of the carrier and comprises an axial width less than an axial width of the carrier.

14. The gas turbine engine as recited in claim 9, wherein the torque frame includes a hub and the finger section includes a base extending axially from the hub to the first end and the second end.

15. The gas turbine engine as recited in claim 14, wherein the base includes a circumferential width that increases in a direction toward the hub.

16. A method of assembling a fan drive gear system for a gas turbine engine comprising:

inserting a shelf extending between gear mount sections of a carrier into a space defined between two ends of a finger section extending from a torque frame; and inserting a pin through openings defined in the two ends of the finger section and the shelf.

17. The method of assembling a fan drive gear system as recited in claim 16, including inserting bushings within openings of the ends of the finger section and the shelf prior to inserting the pin and inserting the pin through the bushings.

18. The method of assembling a fan drive gear system as recited in claim 16, including inserting a retaining pin into an opening in the shelf for holding the pin within the openings in the ends of the finger section and the shelf.

* * * * *